United States Patent
Nardicchia et al.

(10) Patent No.: US 12,479,237 B2
(45) Date of Patent: Nov. 25, 2025

(54) REDUCED NOISE WHEEL HUB UNIT

(71) Applicant: AKTIEBOLAGET SKF, Gothenburg (SE)

(72) Inventors: Riccardo Nardicchia, Turin (IT); Paolo A Re, Nichelino (IT)

(73) Assignee: AKTIEBOLAGET SKF, Gothenburg (SE)

( * ) Notice: Subject to any disclaimer, the term of this patent is extended or adjusted under 35 U.S.C. 154(b) by 84 days.

(21) Appl. No.: 18/535,289

(22) Filed: Dec. 11, 2023

(65) Prior Publication Data
US 2024/0208264 A1 Jun. 27, 2024

(30) Foreign Application Priority Data
Dec. 21, 2022 (IT) .................. 102022000026391

(51) Int. Cl.
*F16C 33/58* (2006.01)
*B60B 27/00* (2006.01)
(Continued)

(52) U.S. Cl.
CPC ...... *B60B 27/0026* (2013.01); *B60B 27/0005* (2013.01); *B60B 27/0094* (2013.01);
(Continued)

(58) Field of Classification Search
CPC .... F16C 19/186; F16C 19/527; F16C 33/586; F16C 2220/68; F16C 2240/54;
(Continued)

(56) References Cited

U.S. PATENT DOCUMENTS 7,478,969 B2   1/2009   Kozlowski et al.
8,038,353 B2   10/2011  Uchiyama
(Continued)

FOREIGN PATENT DOCUMENTS

CN    107816484 A        3/2018
DE    102008053443 A1 *  4/2010  ............ F16C 19/163
(Continued)

OTHER PUBLICATIONS

DE102008053443A1_Decription.*
(Continued)

*Primary Examiner* — Phillip A Johnson
(74) *Attorney, Agent, or Firm* — J-TEK LAW PLLC; Scott T. Wakeman; Mark A. Ussai

(57) ABSTRACT

A vehicular wheel hub unit includes a radially outer bearing ring, a radially inner bearing ring, and a plurality of rolling elements supporting the inner bearing ring and the outer bearing ring for relative rotation. The inner bearing ring has an axially facing metal coupling surface configured to frictionally engage a connecting surface of an element, such as a bell of a constant velocity joint, adjacent to the inner bearing ring, and the coupling surface includes at least one first region having a plurality of coupling surface ablations configured to affect an amount of friction between the coupling surface and the connecting surface. Also a method including ablating at least a first region of a coupling surface of an inner bearing ring.

15 Claims, 4 Drawing Sheets

(51) Int. Cl.
  *F16C 19/18* (2006.01)
  *F16C 19/52* (2006.01)
(52) U.S. Cl.
  CPC .......... *F16C 19/186* (2013.01); *F16C 19/527* (2013.01); *F16C 33/586* (2013.01); *F16C 2326/02* (2013.01)
(58) Field of Classification Search
  CPC ............. F16C 2326/02; B60B 27/0005; B60B 27/0026; B60B 27/0094
  See application file for complete search history.

(56) References Cited

U.S. PATENT DOCUMENTS

| | | |
|---|---|---|
| 8,313,245 B2 | 11/2012 | Norimatsu |
| 2004/0083612 A1 | 5/2004 | Toda et al. |
| 2007/0230850 A1 | 10/2007 | Seo |
| 2010/0329598 A1 | 12/2010 | Norimatsu |
| 2013/0127235 A1 | 5/2013 | Yamamoto et al. |
| 2015/0168241 A1* | 6/2015 | Gierl .................... G01M 13/04 73/855 |
| 2020/0158222 A1 | 5/2020 | Xu |
| 2024/0018997 A1 | 1/2024 | Nardicchia et al. |

FOREIGN PATENT DOCUMENTS

| | | |
|---|---|---|
| DE | 102011057012 A1 | 6/2013 |
| DE | 102016213209 A1 | 1/2018 |
| EP | 1738927 A1 | 1/2007 |
| JP | 2003097588 A * | 4/2003 |
| JP | 2008062901 A * | 3/2008 |
| JP | 2009234480 A * | 10/2009 |
| JP | 2020051444 A | 4/2020 |
| JP | 2020067150 A | 4/2020 |
| JP | 6860309 B2 | 4/2021 |
| WO | 2007141652 A2 | 12/2007 |
| WO | 2010079733 A1 | 7/2010 |

OTHER PUBLICATIONS

JP2003097588A_Decription.*
Written Opinion and Search Report from the Italian Patent Office mailed Jul. 6, 2023 in related application No. IT 102022000026391, and partial translation thereof.

* cited by examiner

REDUCED NOISE WHEEL HUB UNIT

CROSS-REFERENCE

This application claims priority to Italian patent application no. 10 2022 000026391 filed on Dec. 21, 2022, the contents of which are fully incorporated herein by reference.

Technological Field

The disclosure is directed to an ultra-quiet wheel hub unit for vehicles which is configured to be included in a wheel hub assembly.

BACKGROUND

It is known that micro-slipping may occur in vehicular wheel hub assemblies during use. This micro-slippage happens between the surfaces of elements of the wheel hub assembly that are otherwise stably or fixedly coupled together, for example between a fastening flange of a radially outer ring of a wheel hub unit rigidly that is coupled by screws or bolts to a vehicle suspension pillar or between an inner ring of a vehicle wheel hub unit intended to receive a drive wheel and the portion of a constant velocity joint coupled rigidly and in a rotationally fixed manner to the inner ring (or part thereof) by a splined coupling.

Although the wheel hub unit and the other component (constant velocity joint or suspension pillar) are coupled to each other in a rotationally fixed manner, motion reversals of the vehicle, and also accelerations thereof, can cause spontaneous relative movement between the surfaces in sliding contact with one another, resulting in a shift from static friction, which prevents the relative rotary movement between the two surfaces, to dynamic friction, albeit for very small gradient portions resulting from assembly clearances between the wheel hub unit and the other component (constant velocity joint or suspension pillar).

Such localized micro-slipping, even when so small as to be undetectable, nonetheless causes noise when in use, in particular when the wheel hub assembly is subjected to intense localized stresses, such as during a turn or a motion reversal.

Such noise is barely noticeable in conventional vehicles with internal combustion engines because of the background noise generated by the engine, but this noise can become irritating for users of modern electric vehicles, and in particular suggests a malfunction of the wheel hub assembly or of the components thereof where none exists.

There are several known solutions to reduce or eliminate such noise, all of which rely on inserting additional elements, such as shims or washers, between the coupled surfaces that may be subject to localized micro-slipping when in use. These shims or washers may have a low friction coefficient, as in document JP-A-2020-051444, or a high friction coefficient, as in document U.S. Pat. No. 8,038,353 B2.

However, such solutions are somewhat costly since they require an additional element to be present between the interfaces in question, and in particular generate additional encumbrance, which is not always acceptable, may be difficult to assemble, and are subject to wear, said wear possibly relating to both the additional element itself and the essential coatings or anti-corrosion paint present on the coupled metal surfaces for protection of same.

SUMMARY

An aspect of the present disclosure is to provide a wheel hub unit for vehicles that overcomes the drawbacks in the prior art, and that is easy and inexpensive to make.

One specific aspect of the disclosure is to provide a wheel hub unit that is not subject to micro-slipping phenomena when in use and is therefore substantially silent under the effects of external stresses, such as turning or torque reversals when used on vehicles, while at the same time remaining substantially simple to build and assemble, and small, and relatively inexpensive to assemble.

Another aspect of the disclosure comprises a vehicular wheel hub unit that has a radially outer bearing ring, a radially inner bearing ring, and a plurality of rolling elements supporting the inner bearing ring and the outer bearing ring for relative rotation. The inner bearing ring has an axially facing metal coupling surface configured to frictionally engage a connecting surface of an element adjacent to the inner bearing ring, and the coupling surface includes at least one first region having a plurality of coupling surface ablations configured to affect an amount of friction between the coupling surface and the connecting surface.

Still another aspect of the disclosure comprises a method that includes providing an inner bearing ring having an axially facing coupling surface configured to engage a connecting surface of a bell of a constant velocity joint, where the axially facing coupling surface having an initial surface roughness. The method also includes ablating at least one first region of the coupling surface to change the initial surface roughness of the at least one first region of the coupling surface to a new surface roughness, and assembling the inner bearing ring with an outer bearing ring and a plurality of rolling elements to form a vehicular wheel hub unit.

BRIEF DESCRIPTION OF THE DRAWINGS

The disclosure will now be described below with reference to the attached drawings, which show a non-limiting example embodiment thereof, in which.

DETAILED DESCRIPTION

Figure 1:
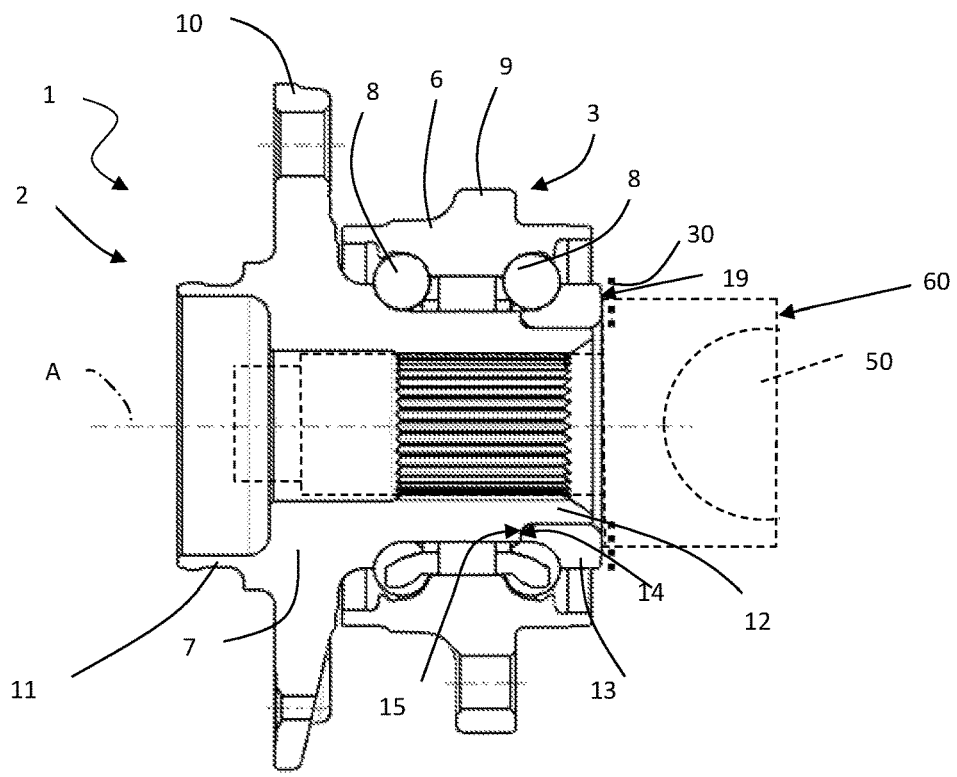
FIG. 1 is a schematic radial cross section of a wheel hub unit according to a first preferred embodiment of the present disclosure.

In FIG. 1, reference sign 1 indicates a vehicle wheel hub assembly in its entirety. The wheel hub assembly comprises a wheel hub unit 2 including a rolling bearing 3, which in the illustrated example is a mixed bearing with two rows of rolling elements (balls) and a bell 50 of a constant velocity joint 60 (both shown schematically in FIG. 1 and of a known type, and thus will not be described further herein).

The wheel hub unit 2 is configured to support a wheel (not shown) of a vehicle in a rotary manner about a rotation axis A and can be axially butt coupled to the bell 50 of the constant velocity joint 60 to transmit a drive torque to the wheel.

The wheel hub unit 2 includes a radially outer ring 6, a radially inner ring 7 and a plurality of rolling elements 8, in this case two rows of balls arranged side by side, interposed between the inner ring 7 and the outer ring 6 to enable relative rotation therebetween.

The outer ring 6 and the inner ring 7 and the rolling elements 8 are part of the rolling bearing 3. In the non-limiting example shown, the rolling bearing 3 is a "third generation" bearing, and therefore directly forms the entire wheel hub unit 2, since the outer ring 6 comprises a known flange 9 that is used for attachment to a suspension pillar (not shown) and is integral with the outer ring 6, and since the inner ring 7 comprises a known flange 10 that is configured to be attached to the wheel of a vehicle (not shown) and is integral with the inner ring 7, particularly at an axial end 11 thereof opposite the flange 9 and at a second end 12 of the inner ring 7.

However, in embodiments, the flanges 9 and/or 10 would be formed on a wheel hub or spindle provided with the rolling bearing 3 without one or both of the flanges 9 and 10, but including the rings 6 and 7 thereof connected to the flanges 9 and 10, respectively, in a rotationally fixed manner.

In the non-limiting, preferred example illustrated, the inner ring 7 is also split, according to a known configuration, into two separate elements that are angularly coupled together in a rotationally fixed manner, one element being an annular element formed by the ends 11, 12 and the one-piece flange 10, and the other element being a known small inner ring 13, driven onto the end 12 to butt axially against an axial shoulder 14 of the inner ring 7 that is oriented towards the end 12.

Figure 2:
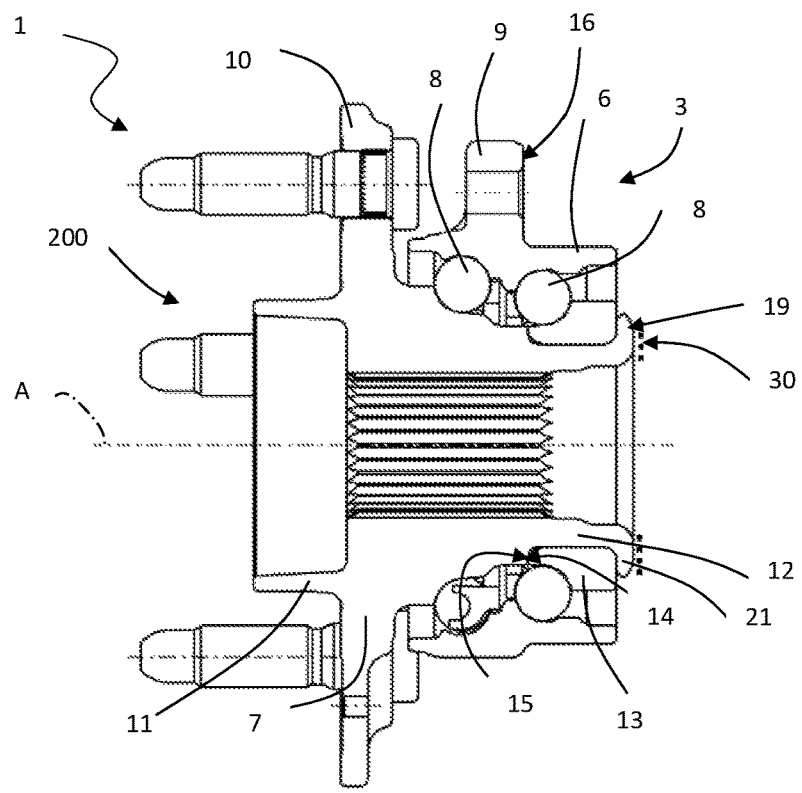
FIG. 2 is a schematic radial cross section of a wheel hub unit according to a second preferred embodiment of present disclosure.

FIGS. 1 and 2 show respective example embodiments of the wheel hub unit.

In particular, FIG. 1 shows an open wheel hub assembly 2 in which the inner rolling ring is axially held in place by attaching the wheel hub unit 2 to the aforementioned constant velocity joint 60.

On the other hand, FIG. 2 shows an asymmetric wheel hub unit 200, i.e. one in which the two rows of rolling elements have different pitch diameters, and in which the inner rolling ring is axially held in place by an annular edge 21 deformed orbitally by cold upsetting. The deformed and upset annular edge is formed against the small inner ring 13, thereby axially securing the small inner ring 13 to the inner ring 7.

In any case, the small inner ring 13 or the inner ring 7 has a metal surface 19 that is part of either the small inner ring 13 or the inner ring 7 and that is or can be butt coupled in contact, and without interposition of additional components, with a corresponding metal surface of the bell 50 of the constant velocity joint 60.

According to the possible embodiments of the disclosure shown in FIGS. 1 and 2, the metal surface 19 can be defined by a front face of the small inner ring 13 axially spaced from the face 15 (FIG. 1) or by a front face of the annular edge 21 which has been deformed and upset against the small inner ring 13 (FIG. 2).

According to one aspect of the disclosure, the metal surface 19 is provided with a plurality of surface ablations 30 (the term "ablation" to be understood indifferently to mean grooves or impressions/depressions) intended to affect the friction between the metal surface 19 and the corresponding mating metal surface of the constant velocity joint. The is intended to reduce the noise generated by stick-slip, which can be done in two ways, either a high-friction method or a low-friction method, each of which is discussed in greater detail below.

In the high friction method, noise reduction is achieved by increasing the roughness of the metal surface 19, i.e. the friction coefficient between the two surfaces in contact so as to almost completely eliminate the stick-slip phenomenon. Given that the roughness value Ra of the metal surface 19, at the end of the finishing processes, is approximately 0.15 µm, according to this method the plurality of surface ablations 30 will have to generate a roughness Ra of between 0.20 µm and 6 µm, according to the results of experimental tests. This method allows the relative slipping between the surfaces in contact to be almost completely eliminated, thereby eliminating any noise associated with this slipping. In particular, the upper value of 6 µm is compatible with a localized laser treatment, which is one possible way of obtaining surface ablations, as explained in more detail below. Furthermore, the value of 6 µm was chosen as it is close to the roughness value used for the interfaces between the radially outer ring and the suspension pillar in order to reduce noise.

In the low friction method, noise reduction is achieved by reducing the roughness of the metal surface 19, i.e. the friction coefficient between the two surfaces in contact to enable practically noise-free local slipping. In this second method, the roughness value Ra must be less than 0.10 µm. This method clearly does not eliminate the relative slipping between the surfaces in contact, but rather facilitates it; however this also significantly reduces the noise associated with such slipping.

The disclosure is applicable both to the wheel hub unit 2 in FIG. 1 and to the wheel hub unit 200 in FIG. 2.

The wheel hub units 2, 200 therefore include these surface ablations in the metal surface 19 (belonging to the small inner ring 13 or to the inner ring 7) which enable very low friction or very high friction between the two surfaces in contact, depending on the method used.

Figure 3:
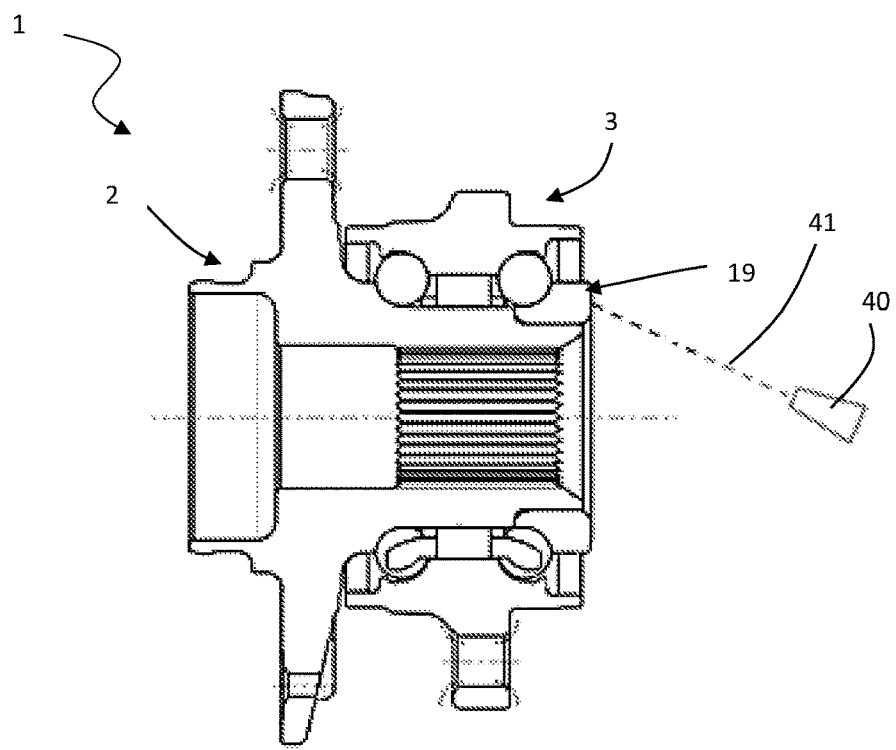
FIG. 3 is a schematic radial cross section of the wheel hub unit of FIG. 1 and a device for implementing an aspect of the disclosure.

With reference to FIG. 3 and as already mentioned, the surface ablations can be obtained by localized laser treatment of the contact surface using a laser device 40 of a known type, for example similar to laser marking devices, performing the localized ablation by means of a pulsed-light laser beam 41. Naturally, the laser device is only one of the possibilities for obtaining surface ablations, which can also be done using other known methods.

The description below refers only to the method according to which the roughness of the metal surface 19 is increased. This is because this methods resolves the technical problem at the root by completely eliminating the slipping between the surfaces and therefore any related noise source, and because this method is easier to control using the normal control parameters of a laser device (power, speed and frequency), given that this method involves forming grooves that are larger than the grooves resulting from the normal surface finish of the small inner ring 13 (or the inner ring 7).

Naturally, the second method (with roughness Ra<0.10 µm) can also be implemented in all the forms described below by changing the aforementioned parameters accordingly.

Advantageously, the plurality of surface ablations can also be present on the corresponding coupling surface of the bell 50 of the constant velocity joint 60 with the metal surface 19 of the small inner ring 13 or of the inner ring 7.

This significantly increases the friction coefficient between the inner ring and the bell of the joint.

The plurality of surface ablations 30 can be described with reference to the macrostructure thereof, i.e. what is visible to the naked eye, this macrostructure being of the same order of magnitude as the diameter of the small inner ring 13 of the bearing 3. Alternatively, the surface ablations 30 can be described with reference to the microstructure thereof, i.e. with the order of magnitude of the obtainable roughness (a few microns or a few tenths or hundredths of microns depending on the chosen method).

Figure 4:
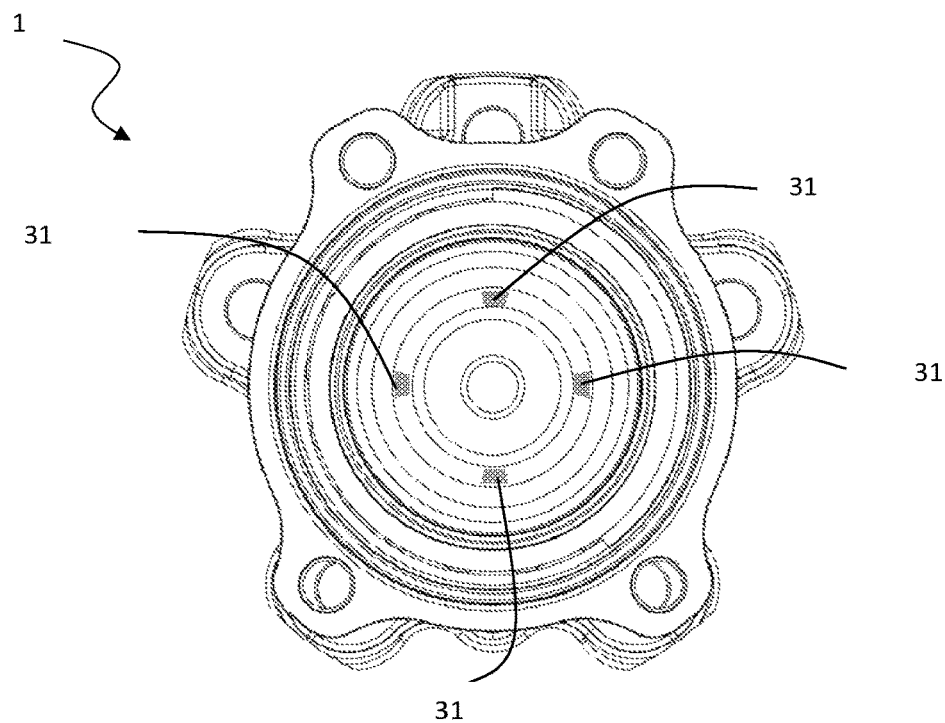
FIGS. 4 and 5 are schematic views of a surface of a bearing inner ring according to the present disclosure at a macrostructure level.
Figure 5:
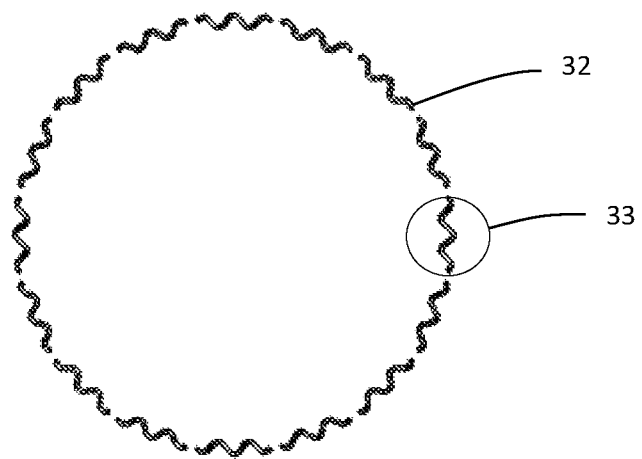

With reference to FIGS. 4 and 5, the macrostructure of the surface ablations 30 can for example take either a localized or continuous circumferential or wavy form each of which is discussed below.

When the surface ablations are localized, each localized surface ablation 31 comprises a plurality of point-like impressions packed together. There may be four localized ablations 31 (as in the example in FIG. 4) arranged circumferentially at 90° from each other. Evidently, both the number of point-like impressions and the number of localized surface ablations 31 are variable and can be optimized using experimental tests based on the intended use of the wheel hub assembly;

When the surface ablations are continuous circumferentially, each surface ablation can be circular so that the entire metal surface 19 is covered by plurality of concentric circular grooves. This shape is well suited to the high friction method as well as to obtaining roughness values of a few microns according to the low friction method.

When the surface ablations are wavy as shown in FIG. 5, each wavy surface ablation 32 can be made by means of a circumferential groove with a plurality of waves 33 with crests and troughs extending in a radial direction. The wavy surface ablations can be continuous or discontinuous, as in FIG. 5. FIG. 5 shows an example in which the waves 33 are discontinuous.

Figure 6A:
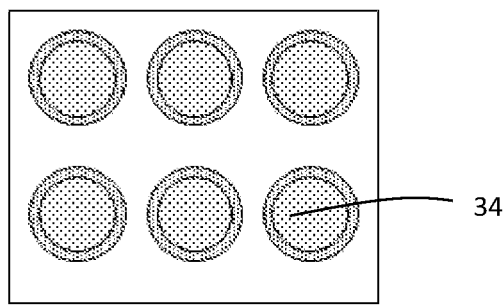
FIGS. 6A, 6B, 7A, 7B and 8 are significantly magnified schematic views of a surface of a bearing inner ring according to the present disclosure at a microscopic level.
Figure 7A:
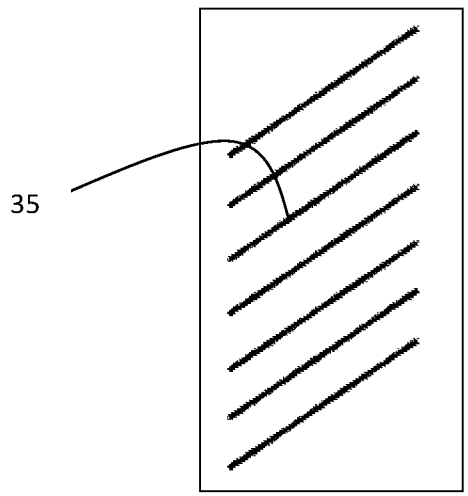
Figure 7B:
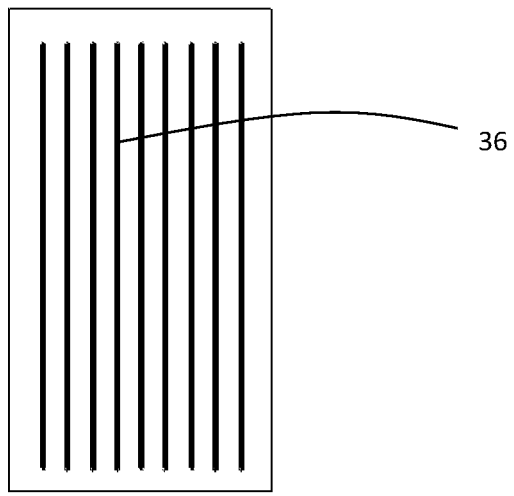
Figure 8:
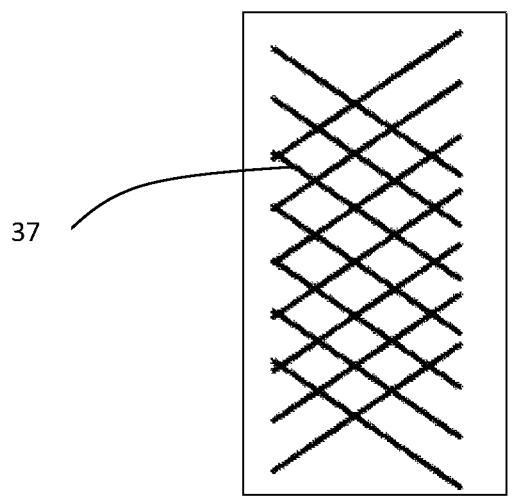

Some examples of the microstructure of surface ablations can be appreciated with reference to FIGS. 6 to 8. The microstructure is not visible to the naked eye and FIGS. 6 to 8 show images acquired with an electron microscope. Different roughness values in different directions can be obtained by acting on the nature of the microstructure. By way of example, embodiments of the microstructure may comprise points. FIG. 6A shows an example of microstructure with points. This microstructure is characterized by a plurality of point-like impressions 34, which are well suited to providing a macrostructure with localized surface ablations 31 (as in FIG. 4). The microstructure can comprise points or lines or grooves.

Figure 6B:
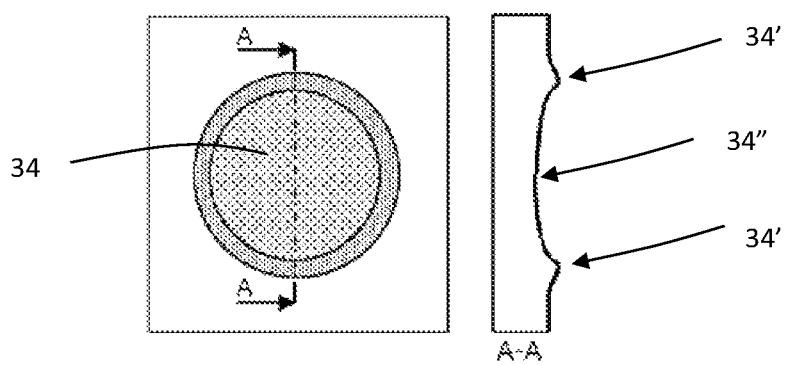

In particular, with reference to FIG. 6B, the microstructure 34 is made on the metal surface 19, and has a crater shape with a concave trough 34" and an annular edge 34' projecting from the metal surface 19. This structure provides further advantages since localized laser treatment causes localized hardening of the material, and a hardened surface combined with the presence of the annular edge 34' improves performance in terms of roughness and consequently increases static friction between the coupling surfaces. The greater surface hardness is achieved because the process involves rapid heating and cooling and has an effect similar to a heat treatment. As a result, the surface structure has greater hardness and abrasion resistance than the base material. The locally hardened surface portions thus increase static friction due to pressure concentrations and local deformations of the corresponding coupling surface;

The microstructure can also take the form of a plurality of lines or grooves, wherein each line can be continuous or comprise a series of points. The line microstructure can have a radial, circumferential or inclined orientation. The example shown in FIG. 7A is a surface ablation with a microstructure with inclined lines 35, while FIG. 7B shows an example of a surface ablation with circumferential lines 36.

In particular, where the linear microstructure comprises a plurality of radial lines, experimental tests have shown that creating a distance between consecutive radial lines of the same order of magnitude as the width of said radial lines, i.e. the width of the grooves created by the laser treatment, is advantageous, again in terms of increasing static friction.

Preferably, the same linear microstructure with radial lines can also be applied on the coupling surface of the bell 50 of the constant velocity joint 60. With this configuration, the pitch of the two coupling surfaces enables meshing. This helps to maximize static friction in the circumferential direction. This condition in which differential roughness is created (high in the circumferential direction, low in the radial direction) facilitates both torque transmission and radial slipping between the coupling surfaces during tightening;

The microstructure can also take the form of a plurality of crossed lines (or crossed grooves), in which each line can be continuous or comprise a series of points. FIG. 8 shows an example of surface ablation with crossed lines 37. Advantageously, such a microstructure allows the same depth value or two different depth values to be used for the crossed lines, creating a single roughness value or two different roughness values, respectively. This solution has the advantage of providing continuous and, if desired, symmetrical immobilization in both relative slipping directions.

In the specific case in which the surface ablations are obtained using a laser device, in addition to the power of the laser source the size of the laser beam and the feed speed of the beam and the frequency of the pulses must be determined. The power of the laser beam defines the minimum size of a single impression, and these two parameters together define the spacing and depth of the micro-grooves.

For example, in tests carried out on the small inner ring 13, speed values of 4000 mm/s and pulse frequency values varying from 30 to 110 kHz were used. Localized surface ablations with a crossed-line microstructure were obtained.

The disclosure can also be applied to other surfaces affected by the stick-slip phenomenon. For example and with reference to FIG. 2, the disclosure can be applied to the surface 16 of the flange 9 of the outer ring 6 that interfaces with a corresponding surface of the suspension pillar.

The present disclosure has numerous advantages. For example, it solves the technical problem of noise deriving from stick-slip, making the wheel hub assembly more stable over time, since the implementation of surface ablations is a process not subject to variation and/or ageing. In addition, there is no impact on the assembly procedures of the wheel hub unit with the constant velocity joint and there are no additional components, and the axial dimensions of the wheel hub assembly (wheel hub unit and constant velocity joint) remain unchanged. Furthermore, from a structural point of view, the presence of surface ablations does not lead to failure, even over time, since the two coupling surfaces are made of hardened steel.

It should be understood that, in addition to the embodiments of the disclosure described above, numerous other variants of the disclosure exist. It should also be understood that said embodiments are merely examples and do not limit the scope of the disclosure, the applications thereof, or the possible configurations thereof. On the contrary, although the description provided above enables the person skilled in the art to carry out the present disclosure at least according to one exemplary configuration thereof, it should be understood that numerous variations of the components described may be devised, without thereby departing from the scope of the disclosure, as defined in the attached claims, interpreted literally and/or according to their legal equivalents.

What is claimed is:

1. A vehicular wheel hub unit comprising:
a radially outer bearing ring,
a radially inner bearing ring, and
a plurality of rolling elements supporting the inner bearing ring and the outer bearing ring for relative rotation,
wherein the inner bearing ring has an axially facing metal coupling surface configured to frictionally engage a connecting surface of an element adjacent to the inner bearing ring,
wherein the coupling surface includes at least one first region having a plurality of coupling surface ablations configured to affect an amount of friction between the coupling surface and the connecting surface, and
wherein the at least one first region comprises a plurality first regions, each adjacent pair of first regions being separated by a non-ablated second region.

2. The wheel hub unit according to claim 1, wherein a surface roughness Ra of the at least one first region is from 0.20 μm to 6 μm.

3. The wheel hub unit according to claim 1, wherein a surface roughness Ra of the at least one first region is less than 0.10 μm.

4. The wheel hub unit of claim 1, including the element adjacent the inner ring,
wherein the connecting surface includes a plurality of connecting surface ablations.

5. The wheel hub unit assembly according to claim 1, wherein each of the first regions comprises a plurality of circular impressions.

6. The wheel hub unit according to claim 1, wherein each of the plurality of coupling surface ablations has a crater shape.

7. The wheel hub unit according to claim 1, wherein each of the plurality of surface ablations has a continuous or discontinuous linear microstructure.

8. The wheel hub unit according to claim 7, wherein the linear microstructure comprises a plurality of radial lines, and
wherein a distance between consecutive radial lines is of a same order of magnitude as a width of each of the radial lines.

9. The wheel hub unit according to claim 1, wherein each of the plurality of coupling surface ablations has a microstructure in the form of crossed lines.

10. The wheel hub unit according to 9, wherein the microstructure in the form of crossed lines generates two different roughness values on the metal surface.

11. The wheel hub unit according to claim 1, wherein the element adjacent to the inner bearing ring comprises a bell of a constant velocity joint.

12. The wheel hub unit according to claim 11, including the constant velocity joint,
wherein the bell of the constant velocity joint includes the connecting surface, and
wherein the coupling surface is in direct contact with the connecting surface.

13. A method comprising:
providing an inner bearing ring having an axially facing coupling surface configured to engage a connecting surface of a bell of a constant velocity joint, the axially facing coupling surface having an initial surface roughness,
ablating at least one first region of the coupling surface to change the initial surface roughness of the at least one first region of the coupling surface to a new surface roughness and leaving at least one surface region of the coupling surface unablated, and
assembling the inner bearing ring with an outer bearing ring and a plurality of rolling elements to form a vehicular wheel hub unit,
wherein the new surface roughness is from 0.20 μm to 6 μm.

14. The method according to claim 13, wherein the ablating comprises a laser ablating.

15. A vehicular wheel hub unit comprising:
a radially outer bearing ring,
a radially inner bearing ring, and
a plurality of rolling elements supporting the inner bearing ring and the outer bearing ring for relative rotation,
wherein the inner bearing ring has an axially facing metal coupling surface configured to frictionally engage a connecting surface of an element adjacent to the inner bearing ring,
wherein the coupling surface includes at least one first region having a plurality of coupling surface ablations configured to affect an amount of friction between the coupling surface and the connecting surface,
wherein each of the plurality of coupling surface ablations is circumferentially continuous, and
wherein each of the plurality of coupling surface ablations comprises a wavy arc shape having a plurality of crests and troughs.

* * * * *